July 10, 1928.

C. H. AU

RECORDER

Filed Jan. 19, 1925

RECORDER

Filed Jan. 19, 1925

Inventor
Carl H. Au,
BY
Attorneys

July 10, 1928.

C. H. AU

RECORDER

Filed Jan. 19, 1925 4 Sheets-Sheet 3

1,676,848

Inventor
Carl H. Au,
Alvaro Cameron
By Lewis & Kirkham
Attorneys

July 10, 1928.
C. H. AU
1,676,848
RECORDER
Filed Jan. 19, 1925
4 Sheets-Sheet 4
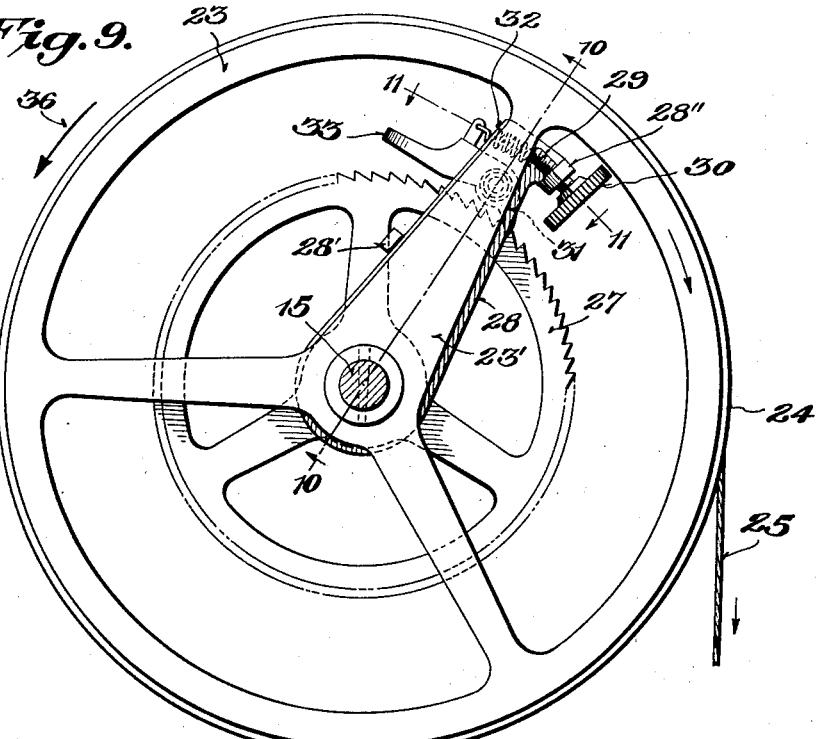
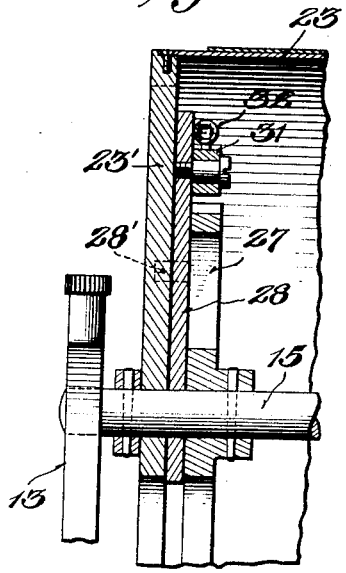
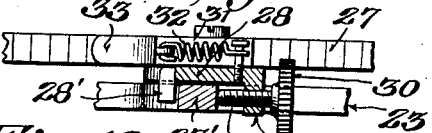
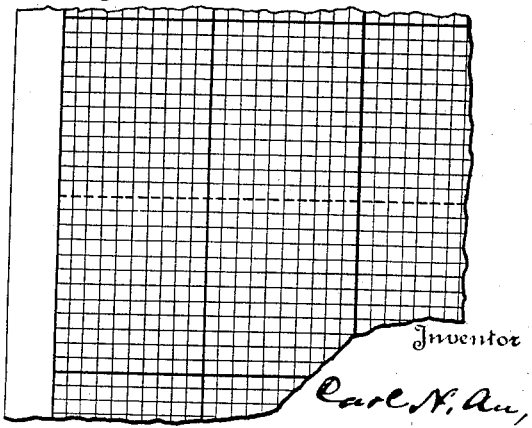

Patented July 10, 1928.

1,676,848

UNITED STATES PATENT OFFICE.

CARL H. AU, OF WASHINGTON, DISTRICT OF COLUMBIA, ASSIGNOR, BY DIRECT AND MESNE ASSIGNMENTS, TO BERTHA B. AU AND JENNIE K. HOYT, BOTH OF WASHINGTON, DISTRICT OF COLUMBIA.

RECORDER.

Application filed January 19, 1925. Serial No. 3,440.

This invention relates to recorders for recording a variable force or movement such, for example, as the rise or fall of water stages. While the invention is not limited in all its features to recorders of the drum type, yet in many of its features it relates more particularly to recorders of that type, that is, those in which the record is made on a single sheet or chart wound around a drum and secured by suitable means thereto. Such recorders in general comprise a time element consisting of a stylus operated by a clock movement regulating the time coordinate, which stylus moves parallel to the axis of the drum, and a height element which consists of a drum turned on its axis to accord with the rise and fall of the water stage through the medium of a float, cord, float wheel and gearing. In such an arrangement the height element is continuous, that is, the drum constituting such element is so constructed as to turn through any number of revolutions and thus record any height. The time element (the stylus) operating along the drum, however, is not continuous; when the stylus arrives at the end of the drum it ceases to record, and, if not manually reset at the other end, the record is lost until it is so reset. Furthermore, since the length of the drum must necessarily be confined within reasonable limits, the time scale or time ratio is limited to very small values, or the record is of short time duration. The gears turning the drum also have to be carefully adjusted to eliminate all lost motion; the stylus used is of the gravity type and so constructed that the gravity devices obscure the record when recording and are in the way when a new chart is to be placed on the drum; and the stylus crosses the paper joint or lap in both directions, thus introducing liability to tear the paper or break the stylus point.

In placing the record-sheet upon the drum various methods have heretofore been followed. The sheet has been simply lapped around the drum and fastened at the ends of the drum by means of an elastic band. By this method the lap occurs at no definite point around the drum and, moreover, causes trouble when the stylus moves in a direction against the lap. By another method the drum was slotted and the two ends of the paper were pushed into the slot until it was drawn smooth on the drum. This allowed an open depression along the slot and, moreover, made the change of the paper quite difficult. A third method in use was to place a metallic strip of some kind over the lap which prevented the stylus from crossing the lap at all, with the result that the records made thereon were not continuous around the drum. And finally, the ends of the record were sometimes pasted together and slipped over an elastic split drum. By this method the paper had to be joined by an experienced person with proper appliances for so doing, and it had to be sent out uncreased and in special containers.

One of the main objects of the present invention is to provide a recorder of the drum type having a continuously operating drum mechanism, and a continuously operated stylus cooperating therewith, one of said elements being controlled by a timing mechanism and the other element being controlled by the variant.

A further object is to provide a recorder of the drum type whereon a continuous record may be made and the record-sheet placed thereon quickly and accurately even by unskilled persons, and in such a manner that the recording stylus cannot possibly catch upon the lapped end of the record-sheet and mutilate the same or break the recording point.

A still further object is to provide a recorder of the drum type whereon a continuous record may be made, and this without unduly extending or lengthening the drum itself or increasing its diameter. A still further object is to provide a gravity record-stylus so constructed that the gravity device shall neither obscure the record during the recording operation nor be in the way when a new record-sheet is applied to the drum.

With these and other objects in view the invention comprises a time element and a height element. The time element comprises a clock operated drum with a record-sheet placed thereon and having one end of the record-sheet inserted in a longitudinal slot in the drum and the sheet then drawn tightly around the drum and lapped over beyond the slot with the end or end corners secured, as by a sticker or any other suitable retaining device. The height element comprises a stylus mounted to travel back and forth along the entire length of the record-sheet on the drum and driven by an endless screw or reversible cam construction operated by a cord passing over a wheel secured to the shaft of said screw and having a weight on one side and a float on the other. Moreover, both the drum and the stylus are capable of being roughly set to approximately the desired positions, as to time and height of water, and means are provided whereby each may then be given a fine adjustment to correspond accurately, the drum with the time of setting, and the stylus set so that the end of its throw, say to the left, shall be exactly at the border line of the record-sheet. In addition, the construction and arrangement is such as to avoid any lost motion between the parts which would result in inaccuracy in the record. The invention further resides in certain specific details of construction and combination of elements that will be more particularly hereinafter described.

One form which the inventive idea may assume is shown in the accompanying drawings, which drawings, however, are for the purpose of illustration only and are not to be taken as defining the limits of the invention, reference being had to the appended claims for this purpose.

In said drawings,

Fig. 9 is a view in elevation of the right-hand end of the drum of Figs. 1 and 2;

Fig. 10 is a broken sectional view on the line 10—10 of Fig. 9;

Fig. 11 is a like sectional view on the line 11—11 of Fig. 9; and

Fig. 12 is a broken plan view of a piece of the record-sheet.

Figure 1:
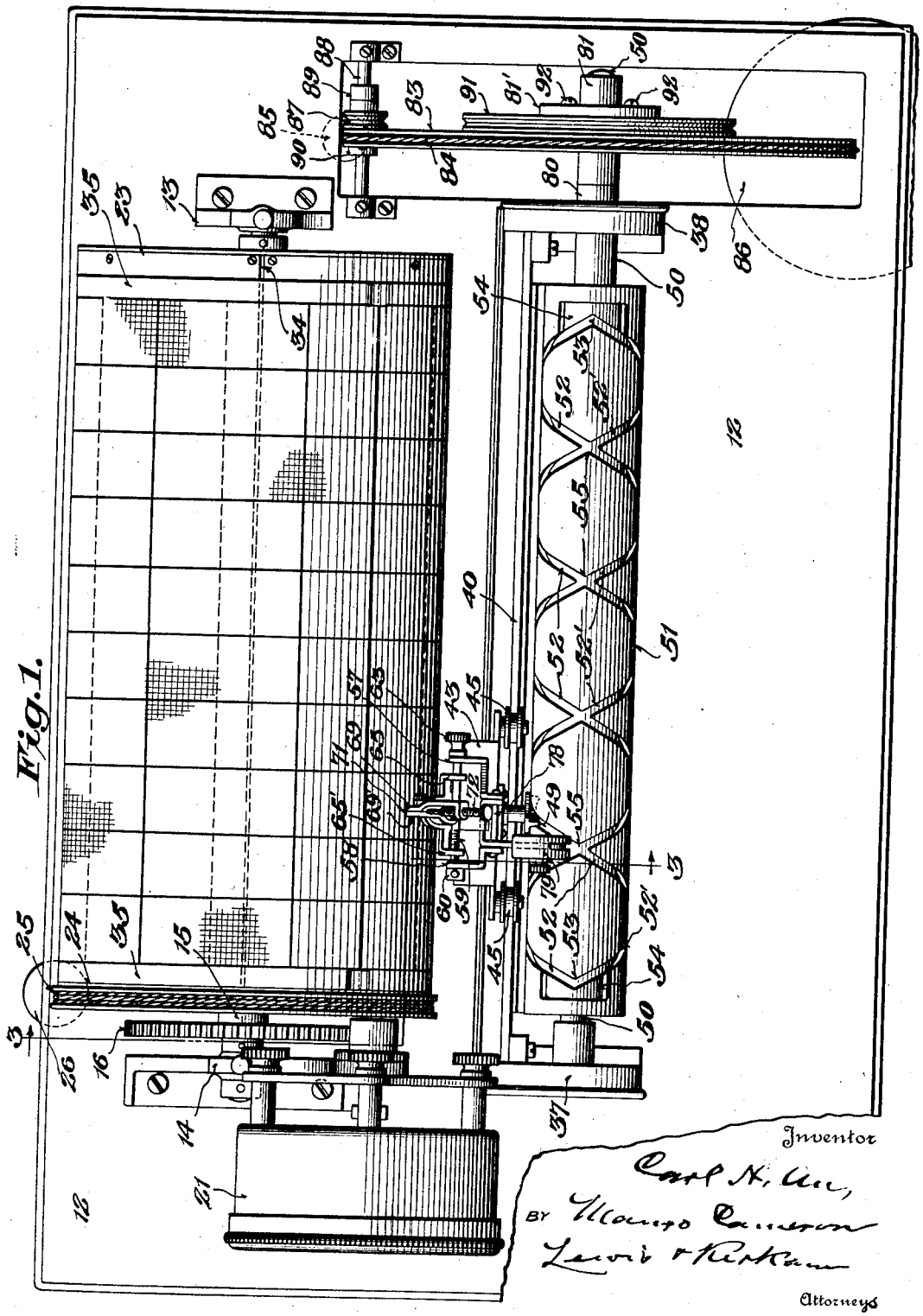
Fig. 1 is a plan view of the recorder.
Figure 2:
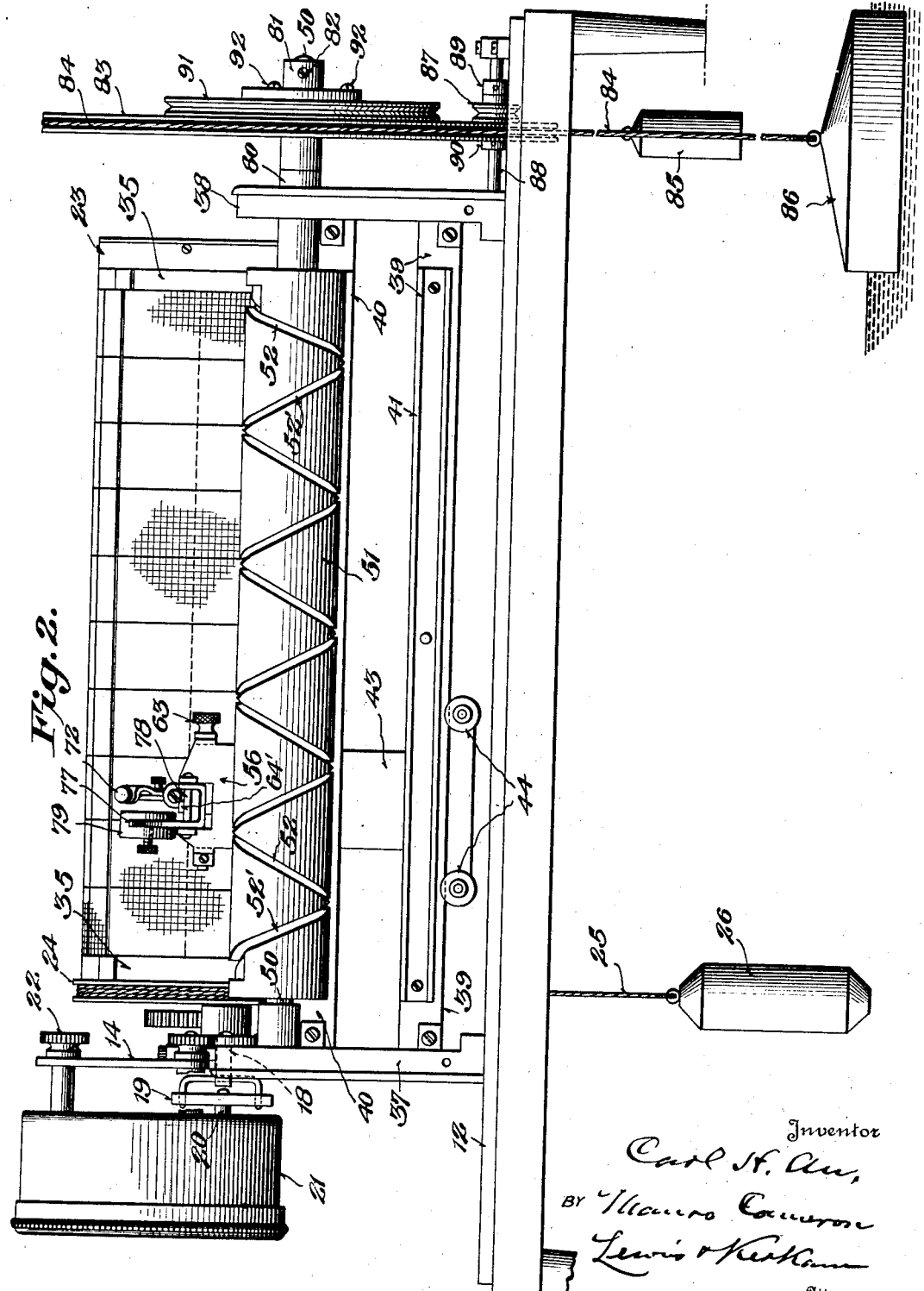
Fig. 2 is a front elevation thereof.

Referring to said drawings, in which like reference numerals indicate like parts, throughout the several views, 12 is a suitable base, preferably of metal, having secured thereto two uprights 13 and 14 in which a shaft 15 (Fig. 9) is mounted to turn. Keyed to the shaft 15 is a gear wheel 16 meshing with a pinion 17 (Fig. 3) keyed to a shaft 18 connected by a universal joint 19, of any suitable construction, to the shaft 20 of a clock 21 mounted on the upwardly extending portion of the upright 14 by means of thumb-screws 22, to the end that the clock may be readily removed and replaced by an unskilled person.

Mounted to turn loosely on the shaft 15 is a drum 23 having on the end thereof a winding groove 24 for receiving a winding cord or cable 25, one end of which is secured to the drum and the other end of which is secured to a weight 26. On the opposite end from the winding groove 24 and within the end of the drum 23 a ratchet wheel 27 is keyed to the shaft 15. Mounted to turn loosely on the shaft 15, between said ratchet wheel 27 and one of the spokes 23' of the drum 23, is an arm 28 having a lug 28' projecting outward so as to engage one side of the spoke 23' and on the opposite side a second outwardly projecting lug 28'' having screw-threaded therethrough an adjusting screw 29 operated by a suitable thumb-wheel 30, the end of said screw being in the same vertical plane as the spoke 23', which spoke may thus have more or less play between the lug 28' and the screw 29, depending upon the adjustment of the latter. Pivotally mounted upon the arm 28 is a pawl 31 held in engagement with the ratchet wheel 27 by a spring 32 as will be readily understood from an inspection of Fig. 9. The pawl has a rearwardly projecting arm 33 by means of which it may be rocked upon its pivot against the tension of the spring 32 and the pawl 31 released from the ratchet wheel 27. Referring to Fig. 9 it will be seen that the drum 23 is driven in clockwise direction by the weight 26 on the cord 25, such movement, however, being timed by the clockwork escapement 21.

On the surface or shell of the drum is a longitudinal slot 34 (Fig. 1) and in placing the record-sheet 35 on the drum said sheet is creased near one end along any desired transverse line and the creased end inserted in the slot 34, and the sheet is then wound around the drum in the reverse direction from that in which the drum is to move when in operation, that is to say, viewing the end of the drum as shown in Fig. 9 the sheet is to be wound in the direction indicated by the arrow 36, and is to be carried entirely around the drum and wrapped a considerable distance over the slot 34, when the end may be secured in any suitable manner, as for example, by stickers at the corners and, if desired, intermediate the corners. Stickers at the corners, however, will be found amply sufficient.

While the drum is here shown as connected to the timing escapement or clock 21 by suitable gearing, it will be readily appreciated by those skilled in the art that, if desired, said escapement may be directly connected to the drum shaft 15.

The record-sheet is preferably provided with lines extending longitudially of the drum spaced for a time scale such as hours or fractions thereof, and with lines extending circumferentially of the drum spaced for any desired height scale as feet or meters. The hour lines are divided into days by heavier lines placed twenty-four hours apart; preferably the noon day lines are distinguished from the other heavy lines by being dotted and placed twelve hours distance from the heavy midnight lines. In like manner the circumferential lines indicating feet or other height scale are divided into groups of ten each by heavy circumferential lines, all of this as well known and understood in the art. Preferably, the drum is of such circumference and the record-sheet is so proportioned that, when the sheet is in place on the drum and the connection with the clockwork escapement suitably proportioned, the drum will make a complete revolution in a predetermined number of days plus a half day, as for example, seven and one-half days, though manifestly any other proportions may be adopted to secure either a longer or shorter period of time for a single revolution of the drum.

Figure 7:
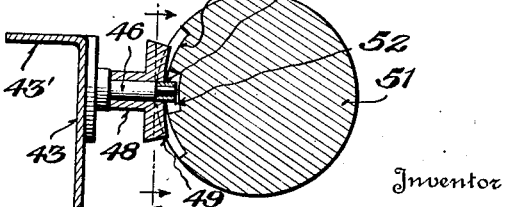
Fig. 7 is a sectional view on the line 7—7 of Fig. 6.
Figure 8:
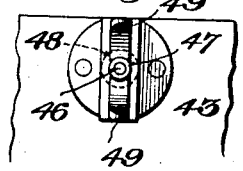
Fig. 8 is a bottom plan view of the screw-engaging pin and guide-boat.

Referring now to Figs. 1 and 2, 37 and 38 are suitable standards mounted on the frame 12 in front of the drum 23, and extending between these two standards are two horizontal parallel bars 39 and 40, which bars are preferably stiffened by angular pieces 41 and 42 rigidly secured thereto. These two bars 39 and 40 form tracks or ways upon which travels a carriage 43 having wheels 44 which engage the under side of the bar 39 and similar wheels 45 engaging the upper side of the bar 40. By providing the four wheels amply spaced apart both vertically and horizontally the free running of the carriage upon the tracks or ways 39 and 40 is assured without any lost motion. Projecting from the carriage 43 and rigidly secured thereto is a pin 46 carrying on its end a roller 47 (Fig. 7), and also having thereon a freely turning sleeve 48 bearing a guide-shoe or boat 49 whose wings or arms extend radially on diametrically opposite sides of said sleeve and whose under surface is preferably slightly concave as shown in Fig. 7, the roller 47 projecting outward beyond said concave surface of the shoe or boat 49.

Figure 6:
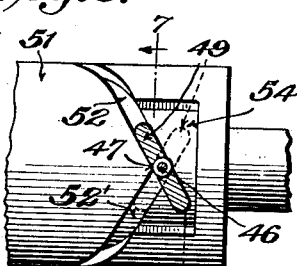
Fig. 6 is a broken detail on the line 6—6 of Fig. 7, showing one end of the screw cylinder and the guide-boat.

Mounted in the standards 37 and 38 is a shaft 50 bearing a metal cylinder 51 having two helical grooves 52, 52' of the same uniform but reversed pitch formed in the surface thereof, the ends of said grooves meeting at the extreme ends 53. 53 (Fig. 1), the two grooves together constituting in effect an endless cam groove or screw. At the end of the cylinder, and immediately opposite where the ends of the grooves 52, 52' join, the surface of the cylinder is cut out as at 54, to a depth, however, less than that of the grooves 52, 52'. The roller 47, on the end of the pin 46, takes into the groove 52, 52', as the case may be, approximately to the full depth thereof, and as said roller follows along said grooves the guide or boat 49 extends into the grooves, but only to about half the depth thereof, said boat or guide serving to effectually bridge the points 55 (Fig. 1) where the grooves cross, to the end that the roller 47 will continue in the groove 52 or 52', as the case may be, until it reaches the junction point of said grooves at either end thereof. At this point, referring now to Fig. 6, the guide or boat continues in the direction of the groove in which it is traveling until the roller 47 reaches the exact point of juncture of the two grooves as shown in Fig. 7. The left-hand side of the groove 52 (Fig. 6) is pressing against the left-hand side of the boat as viewed in Fig. 6, and quickly, and practically instantaneously, turns the same from the position shown in full lines and extending in the direction of the groove 52 to that shown in dotted lines and extending in the direction of the groove 52'. At this instant the right-hand surface of the groove 52', as viewed in Fig. 7, advances past and reverses the direction of the motion of the roller 47, and consequently the pin 46 which carries the boat 49, and the boat or guide 49 enters the groove 52' thus reversing the movement of the pin 46 and with it the carriage 43. This reversal is practically instantaneous, there being no appreciable loss of time occasioned thereby in the movement of the carriage. The sole function of the boat 49 is to carry the roller 47 across the points where the two grooves 52 and 52' intersect and maintain the roller in the proper groove. At all other points the propulsion of the stylus carriage is accomplished by the engagement of the roller with the cam or screw grooves which constitute a continuous track or orbit always within the lateral limits of the record-sheet and which act to reverse the movement of the stylus without reversal of movement of the float 86 or other variant-actuated element. Moreover, since the reversal of movement is practically instantaneous and without changing the pitch of the cam groove or screw thread, the ratio of movement between the variant and the stylus remains constant not only throughout the length of the cam grooves 52, 52', but also at the point 53 of their juncture. The result of this is that, throughout its entire length, the record traced by the stylus is an exact record of the level of the water or other variant.

Figure 5:
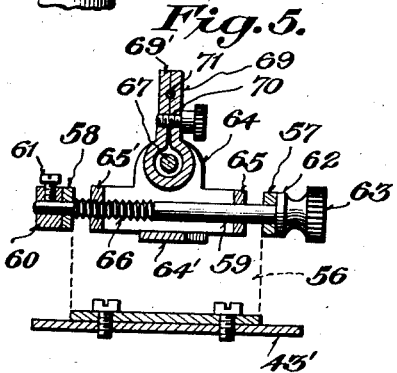
Fig. 5 is a sectional view on the line 5—5 of Fig. 3.

Mounted on the flange 43'. of the carriage 43, turned inwardly toward the drum 23, is an upwardly projecting bracket arm 56 having two ears 57, 58 (Fig. 5) in which turns a shaft 59 having on the end thereof a sleeve 60, which may be in the form of a screw-threaded nut or otherwise, through which extends a set-screw 61 into engagement with the shaft. The two ears 57 and 58 are closely clamped between the sleeve 60 and the shoulder 62 on a knurled wheel 63 integral with the shaft 59, to the end that the shaft 59 may be turned in the ears 57, 58 through the medium of the knurled wheel 63, but only against considerable friction which will avoid any accidental or unintentional movement of the shaft 59.

Mounted to slide on the shaft 59 is a plate 64 having ears 65, 65' through which the shaft passes and by which the plate 64 is supported. The ear 65' is interiorly screw-threaded and that portion of the shaft 59 which passes therethrough is screw-threaded as shown at 66 so that any revolution of the shaft 59 serves to move the plate 64 to the left or the right as the case may be. Clamped to the plate 64 by screw 67 and an intermediate washer 68 is a stylus support composed of a piece of spring metal bent around the screw 67 and having two projecting arms 69, 69' held into more or less close relation by a screw 70. The inner or adjoining faces of the two arms 69, 69' are grooved to receive the stylus 71, the frictional engagement with the style being adjusted through the medium of the screw 70. Preferably this adjustment is such as to prevent the style from falling out of its own weight while at the same time permitting it to slide freely under the application of a small force. This force is applied to move the point of the style outward through the medium of a screw 72, Fig. 3, formed in an ear 73 on an outwardly projecting part 74 of the arm 69. Said screw 72 bears directly against the inner end of the style 71 and it may be manipulated to push the style as far outward as may be desired.

The plate 64 has a rearwardly projecting arm 64' which is engaged by one arm 76 of a lever 77 fulcrumed at 78 on the bracket arm 56 and carrying an adjustable weight 79. The position of the lever arm 76 and the length of the rearwardly extending arm 64' are such that when the stylus 71 is in engagement with the record-sheet the lever arm 76 engages the under side of the arm 64' and the weight 79 acts to hold the stylus in engagement with the record. If, however, the weight 79 be raised, that is thrown from the right to the left in Fig. 3, the lever arm 76 will be withdrawn from under the arm 64' and the stylus may be then lifted from the record into the position shown in Fig. 4, and the weight may then be thrown from the left to the right assuming the position shown in Fig. 4, so that neither the stylus nor the weight is in the way of an attendant in removing the record-sheet from and placing another on the drum. This being accomplished the weight 79 is moved from the right to the left, Fig. 4, permitting the stylus to again fall in contact with the record, when the weight is again thrown back into the position shown in Fig. 3 and acts to yieldingly hold the stylus in contact with the record.

The shaft 50 is extended at the right (Figs. 1 and 2) through the standard 38 and has a collar 80 keyed thereon, and between said collar and a hub 81 also fixed to the shaft, as by a set-screw 82, is a grooved wheel 83 over which passes a cable 84 supporting a weight 85 at one end and a float 86 at the other. At the side of the grooved wheel 83 is preferably mounted a second grooved wheel 91, the two wheels 83 and 91 being preferably formed integral or rigidly secured together, and when the two are in place they are secured to the hub 81 by screws 92 passing through a flange 81' on the hub and into the wheel 91. The cable 84 may pass over the wheel 91 and then over a guide roll 87 (Fig. 1) mounted on a shaft 88 and adjustable along said shaft between two collars 89 and 90 which collars may be fixed to the shaft by set-screws as shown. By this construction the rate of movement of the carriage for any given change in the water stage may be adapted to either one of two scales, a larger extended scale corresponding to the grooved wheel 83 and a smaller and less extended scale corresponding to the grooved wheel 91. If it be desired to adopt any scale differing from that corresponding to either the wheel 83 or 91, or if for any reason it is desired to use any other wheel, this may be readily accomplished by loosening the set-screw 82, removing the wheels 83 and 91, together with the hub, and then removing the latter from the wheels by loosening the screws 92. The hub is then attached to the substitute wheel to be employed and the same placed in position on the shaft 50 and the set-screw tightened. By thus employing the hub 81 it is only necessary to machine the single hub for any number of interchangeable wheels, which latter need not be machined to such an exact fit on the shaft as would otherwise be required.

Figure 3:
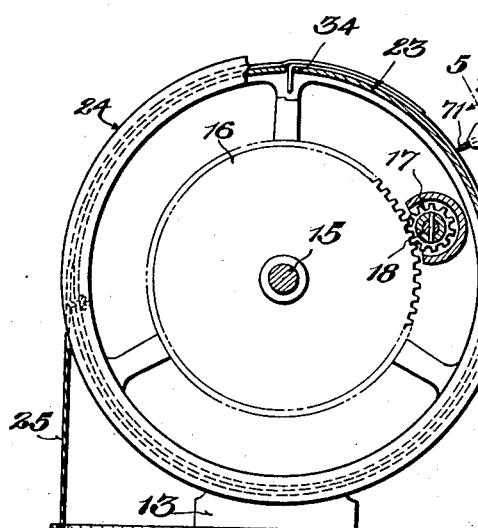
Fig. 3 is a sectional view on the line 3—3 of Fig. 1.
Figure 4:
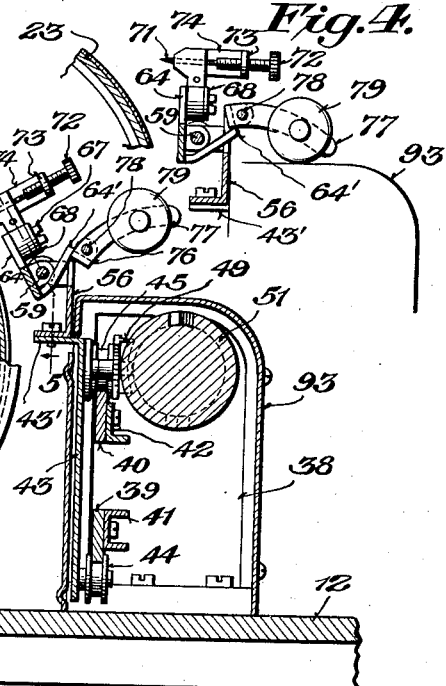
Fig. 4 is a fragmentary view showing the stylus in raised or inoperative position.

Referring to Fig. 3 the cylinder 51, carriage 43 and the tracks upon which the latter runs are preferably enclosed in a cover as 93 suitably retained in place whereby dirt is excluded from these parts.

It is to be observed that in placing the record-sheet upon the drum, it is only necessary for the sheet to be creased at right angles to its edge portion, say along one of the lines extending longitudinally of the drum, the creased end inserted in the slot and the sheet then wrapped around the drum and secured smoothly in position at the corners. During this operation the stylus is thrown back from the drum and is held in such position by the weighted lever. The paper being positioned, the stylus is then thrown forward in contact with the record-sheet, and the lever thrown in position to hold the stylus yieldingly in such contact, and as the drum revolves only in one direction and that direction is such to cause the stylus to pass off of the overlapping end of the sheet, it is impossible for the stylus to catch upon such overlapping end with resultant destruction either to the sheet or the stylus.

Furthermore, since the drum carrying the record-sheet is controlled by the time escapement, it is apparent that it may revolve continuously, making revolution after revolution without the necessity of any attention further than that required to wind up the clock and the weighted cable which furnishes the power to drive the same. It is therefore clear that the timing element in the recording operation is continuous and that such element is in the form of a continuously revolving time-controlled drum. It will also be apparent that the variant element (which in the case we have assumed is the element controlled by variations in the water stage) is also a continuously operating one. Thus, without regard to the number of revolutions that the drum under control of the time escapement may make, the stylus will continue at all times to record the exact water stage. Even if for an entire revolution there be no variation in the water stage, and then in a subsequent revolution a variation would occur, the stylus would accurately record the same. From this it is apparent that the invention involves a recorder of the drum type having a continuously operated drum carrying the record-sheet combined with the continuously operating stylus co-operating therewith, one of which is operated by a time element and the other by the variable force or movement.

In the winding operation, when the drum is turned to wind up the weight 26, the winding is effected through a step-by-step operation, the smallest step being the length of one of the ratchet teeth on the ratchet wheel 27. This may leave the record-sheet in such a position that the stylus will not contact with the sheet at the required time of day, which may fall between two of the time spacing lines, such space, for example, being equivalent to the amount of movement of the drum in an hour's time. For the purpose of exactly locating the drum, the fine adjustment by means of the screw 29 is provided. By means of this screw the drum may be moved in either direction a distance less than that of a single tooth on the ratchet wheel 27, and thus bring the record-sheet into the exact position required under the stylus.

Since the stylus carriage is propelled by the screw or cam grooves 52, 52' solely by reason of the engagement of the roller 47 in said groove, and since said roller passes from one of said grooves to the other at the juncture point 53 instantaneously, there is no loss of time in the reversal operation occurring at the juncture of the two grooves. This is rendered possible by reason of the fact that the guide boat 49 performs no function so far as the driving of the stylus carriage is concerned, and in fact functions only as a means of insuring the continuance of the roller 47 in the particular groove of the endless screw in which it may be traveling at the point 55 where said grooves 52, 52' cross. Such boat performs no function at the point 53 where the groove 52 passes into the groove 52', and it is instantly reversed at such point so that there is no loss of time due to such reversal. This is a matter of extreme importance, since if there were loss of time at this point, the timing of the entire record would be changed; or, in other words, the record would not be made at the time indicated on the record-sheet.

While the endless screw construction is here shown in connection with a recorder for recording a variable force or movement, it is not confined to such use, since it will be apparent that such a construction is readily applicable to a great variety of mechanical devices wherein it is desired to drive and instantly reverse a moving carriage or part through the medium of an endless screw, the reversal being secured without the loss of time in such operation.

It will further be apparent to those skilled in the art that, by reason of the fact that the cable 25 attached to the driving weight 26 is wound directly upon the drum, all lost motion between the drum and the timing escapement is eliminated. This is a feature of much importance, since if any lost motion occurred it would introduce a variation of time in the record, thus making the record inaccurate and unreliable.

It will be apparent to those skilled in the art that various changes and modifications may be made in the structure herein shown and described as embodying the invention without departing from the spirit of the invention itself, and that such description and illustration are not to be taken as defining the limits of the invention, reference being had to the appended claims for that purpose.

What is claimed is:—

1. In a recorder for recording a variable force or movement, the combination of a shaft, a timing mechanism connected to and controlling the revolution of said shaft, a drum mounted to turn on said shaft, a pawl and ratchet connection between said drum and shaft, and means for finely adjusting said drum around the shaft independently of said pawl and ratchet.

2. In a recorder for recording a variable force or movement, the combination of a carriage, a stylus support capable of turning in a vertical plane on an axis mounted on the carriage, a weighted lever also pivoted on an axis in the carriage independently of the axis of the stylus support, and a lever on said stylus support engaged by said weighted lever, whereby the stylus is yieldingly held in engagement with the record-sheet.

3. In a recorder, the combination of a carriage, a stylus carrier fulcrumed thereon, a weighted lever also fulcrumed on said carriage, a lever on said carrier, and an arm on said weighted lever, the lengths of said parts being such that at one point of their turning they clear each other whereas at other points of their turning movement the arm on the weighted lever engages either above or below the lever of the stylus carrier, whereby said weighted lever acts to hold the stylus either in its raised or depressed position as the case may be.

In testimony whereof I have signed this specification.

CARL H. AU.